US007706674B2

(12) United States Patent
Sugimoto et al.

(10) Patent No.: US 7,706,674 B2
(45) Date of Patent: Apr. 27, 2010

(54) DEVICE AND METHOD FOR CONTROLLING FLASH

(75) Inventors: Masahiko Sugimoto, Asaka (JP); Kenji Ito, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 326 days.

(21) Appl. No.: 11/727,563

(22) Filed: Mar. 27, 2007

(65) Prior Publication Data

US 2007/0230933 A1   Oct. 4, 2007

(30) Foreign Application Priority Data

Mar. 28, 2006 (JP) ............................. 2006-087647

(51) Int. Cl.
*G03B 15/05* (2006.01)
(52) U.S. Cl. ..................... 396/61; 396/65; 396/164; 396/204; 348/371
(58) Field of Classification Search ................ 396/51, 396/61, 62, 65, 67–68, 106, 108, 124, 164, 396/166–167, 204; 348/370–371
See application file for complete search history.

(56) References Cited

U.S. PATENT DOCUMENTS

| 4,359,275 | A | * | 11/1982 | Hasegawa | 396/162 |
| 4,801,964 | A | * | 1/1989 | Desormeaux | 396/106 |
| 5,198,855 | A | * | 3/1993 | Iwai | 396/106 |
| 6,693,673 | B1 | * | 2/2004 | Tanaka et al. | 348/371 |
| 7,164,446 | B2 | * | 1/2007 | Konishi | 348/349 |
| 2007/0177050 | A1 | * | 8/2007 | Xiao et al. | 348/371 |
| 2009/0073275 | A1 | * | 3/2009 | Awazu | 348/222.1 |

FOREIGN PATENT DOCUMENTS

| JP | 2002-333649 A | 11/2002 |
| JP | 2003-75717 A | 3/2003 |
| JP | 2003-107567 A | 4/2003 |
| JP | 2004-109679 A | 4/2004 |
| JP | 2004-320284 A | 11/2004 |

* cited by examiner

*Primary Examiner*—W. B. Perkey
*Assistant Examiner*—Bret Adams
(74) *Attorney, Agent, or Firm*—Birch, Stewart, Kolasch & Birch, LLP (57) ABSTRACT

A flash controlling method is disclosed. The method includes: acquiring image data by photographing a subject; detecting a predetermined target object from the image data; calculating a distance to the predetermined target object based on a size of the detected predetermined target object; controlling an amount of flash light to be emitted based on the calculated distance; setting a predetermined threshold based on a reachable distance of the flash light; and inhibiting emission of the flash light when the calculated distance is larger than the predetermined threshold.

4 Claims, 7 Drawing Sheets

WHEN SIZE OF FACE IS $S_1$, DISTANCE TO FACE IS $D_1$

FIG.4B

WHEN SIZE OF FACE IS $S_2$, DISTANCE TO FACE IS $D_2$ $$\begin{pmatrix} S_1 > S_2 \\ D_1 < D_2 \end{pmatrix}$$

FIG.5A

WHEN DISTANCE BETWEEN EYES IS $S_1'$, DISTANCE TO FACE IS $D_1'$

FIG.5B

WHEN DISTANCE BETWEEN EYES IS $S_2'$, DISTANCE TO FACE IS $D_2'$ $$\begin{pmatrix} S_1' > S_2' \\ D_1' < D_2' \end{pmatrix}$$

FLASH LIGHT REACHES FACE

FLASH LIGHT DOES NOT REACH FACE AND DUST WITHIN REACHABLE RANGE OF FLASH LIGHT IS LIT UP

DEVICE AND METHOD FOR CONTROLLING FLASH

BACKGROUND OF THE INVENTION

1. Field of the Invention

The present invention relates to a flash controlling device and a flash controlling method for use with a photographing apparatus, such as a digital still camera, with a flash function.

2. Description of the Related Art

Photographing methods for use with photographing apparatuses, such as digital cameras and digital video cameras, in which a target object is detected from a photographed image during photographing and a distance to the target object is calculated based on the size of the target object, to carry out some control based on the result of the calculation, have conventionally been known.

One example of such photographing methods is a method of controlling a light modulation operation according to the distance to the target object calculated based on the size of the target object on the photographing screen. Examples of the light modulation operation include increasing an amount of emitted light and increasing the aperture when the distance is large, and decreasing the amount of emitted light and decreasing the aperture when the distance is small (see Japanese Unexamined Patent Publication No. 2003-075717).

Another example is a method of preventing "white out" of the target object by decreasing the amount of flash light when the ratio of the size of the detected target object on the photographing screen is higher than or equal to a predetermined value, determining that a close-up image of the target object is being photographed (see Japanese Unexamined Patent Publication No. 2003-107567).

However, in the above-described photographing methods, although the amount of emitted light is controlled, flashing is carried out when the target object has been detected. In these methods, even if a target object has been detected, the flash light may not reach the target object if the distance to the detected target object is large.

SUMMARY OF THE INVENTION

In view of the above-described circumstances, the present invention is directed to provide a flash controlling device and a flash controlling method which inhibit useless flashing.

An aspect of the flash controlling device of the invention is a flash controlling device including: an acquiring means for acquiring image data by photographing a subject; a detecting means for detecting a predetermined target object from the image data; a calculating means for calculating a distance to the predetermined target object based on a size of the predetermined target object; a flashing means for emitting flash light toward the subject; a flash controlling means for controlling an amount of the flash light to be emitted by the flashing means based on the calculated distance; and a threshold setting means for setting a predetermined threshold based on a reachable distance of the flash light, wherein the flash controlling means inhibits emission of the flash light by the flashing means when the distance calculated by the calculating means is larger than the predetermined threshold.

It should be noted that the "predetermined target object" in the invention refers to an object having a known size, such as a face or eyes of a person, or a face of an animal, so that the distance can be calculated based on the size.

In the flash controlling device of the invention, the predetermined target object may be a face or eyes of a person.

An aspect of the flash controlling method of the invention is a flash controlling method including: acquiring image data by photographing a subject; detecting a predetermined target object from the image data; calculating a distance to the predetermined target object based on a size of the detected predetermined target object; controlling an amount of flash light to be emitted by a flashing means based on the calculated distance; setting a predetermined threshold based on a reachable distance of the flash light; and inhibiting emission of the flash light by the flashing means when the calculated distance is larger than the predetermined threshold.

DESCRIPTION OF THE PREFERRED EMBODIMENTS

Hereinafter, an embodiment of a flash controlling device according to the present invention will be described in detail with reference to the drawings. In this embodiment, description is made by taking a digital camera as an example of an electronics device with a flash controlling device of the invention. However, the invention is applicable not only to digital cameras, but also to other electronics devices with electronic photographing function, such as cellular phones with camera function and PDAs with camera function.

Figure 1:
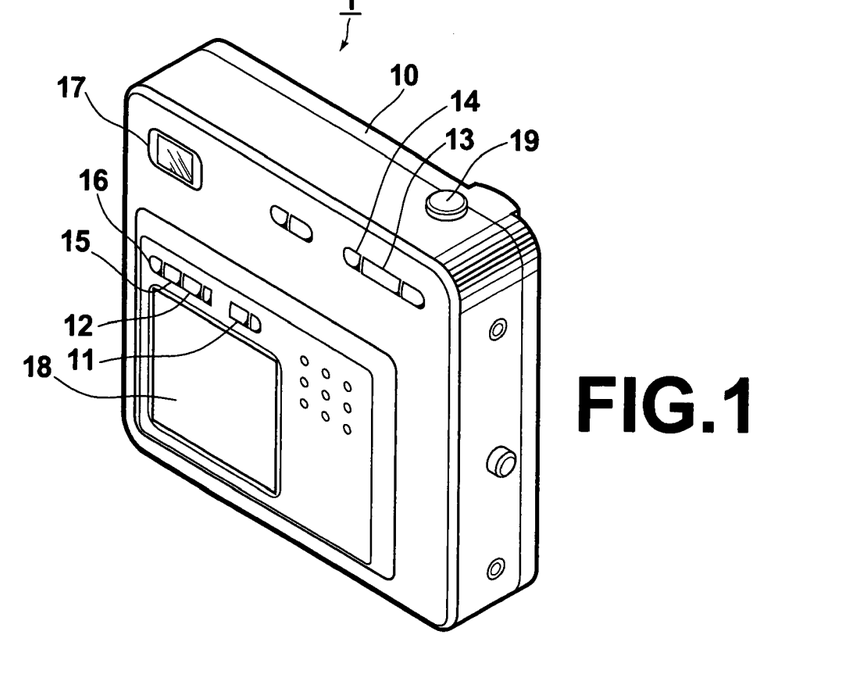
FIG. 1 is a rear view of a digital camera.
Figure 2:
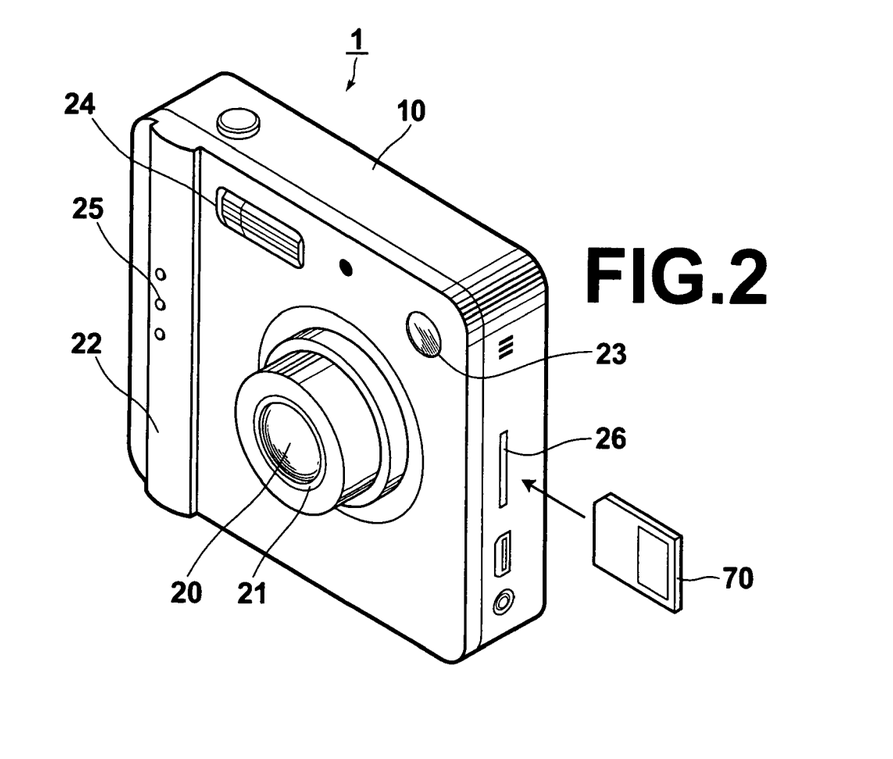
FIG. 2 is a front view of the digital camera.

One example of the digital camera is shown in FIGS. 1 and 2. FIG. 1 is a rear view and FIG. 2 is a front view of the appearance of the digital camera. As shown in FIG. 1, the digital camera 1 includes, on the back side of a body 10 thereof an operation mode switch 11, a menu/OK button 12, a zoom/up-down lever 13, a right-left button 14, a Back (return) button 15 and a display switching button 16, which serve as an interface for manipulation by a photographer, as well as a finder 17 for photographing, a monitor 18 for photographing and playback, and a shutter button 19.

The operation mode switch 11 is a slide switch for switching between operation modes, i.e., a still image photographing mode, a motion image photographing mode and a playback mode. The menu/OK button 12 is a button to be pressed to display on the monitor 18 various menus for setting a photographing mode, a flash mode, the number of pixels to be recorded, sensitivity, and the like, or to make decision on a selection or setting based on the menu displayed on the monitor 18.

The zoom/up-down lever 13 is to be tilted up or down to adjust the telephoto/wide-angle position during photographing, or to move a cursor up or down within the menu screen displayed on the monitor 18 during various settings. The right-left button 14 is used to move the cursor right or left within the menu screen displayed on the monitor 18 during various settings.

The Back (return) button 15 is a button to be pressed to terminate a current setting operation and display a previous screen on the monitor 18. The display switching button 16 is a button to be pressed to switch between ON and OFF of the display on the monitor 18, ON and OFF of various guidance displays, ON and OFF of text display, or the like. The finder 17 is used by the user to see and adjust the picture composition and/or the point of focus during photographing a subject. An image of the subject viewed through the finder 17 is captured via a finder window 23 provided on the front side of the body 10 of the digital camera 1.

Contents of the setting made through user's manipulation of the above-described buttons and/or the lever can be visually confirmed, for example, by the display on the monitor 18, by the lamp in the finder 17 and/or by the position of the slide lever. The monitor 18 serves as an electronic view finder by displaying a live view for viewing the subject during photographing. The monitor 18 also displays a playback view of photographed still images or motion images, as well as various setting menus. As the user manipulates the shutter button 19, photographing is carried out based on the determined exposure and focused focal point, and the image displayed on the monitor 18 is recorded as a photographed image.

As shown in FIG. 2, the digital camera 1 further includes, on the front side of the body 10 thereof, an imaging lens 20, a lens cover 21, a power switch 22, the finder window 23, a flash light 24 and a self-timer lamp 25. Further, a media slot 26 is provided on a lateral side of the body 10.

The imaging lens 20 focuses an image of the subject on a predetermined imaging surface (such as a CCD provided within the body 10), and is formed, for example, by a focusing lens and a zooming lens. The lens cover 21 covers the surface of the imaging lens 20 when the digital camera 1 is powered off or in the playback mode to protect the imaging lens 20 from dust and other contaminants. The power switch 22 is used to power on or power off the digital camera 1. The flash light 24 is used to momentarily emit necessary light for photographing toward the subject when the shutter button 19 is pressed and while the shutter within the body 10 is open. The self-timer lamp 25 serves to inform the subject a timing of opening and closing of the shutter during photographing using a self-timer. The media slot 26 is a port for an external recording medium 70, such as a memory card, to be loaded therein. As the external recording medium 70 is loaded in the media slot 26, writing and reading of data are carried out, as necessary.

Figure 3:
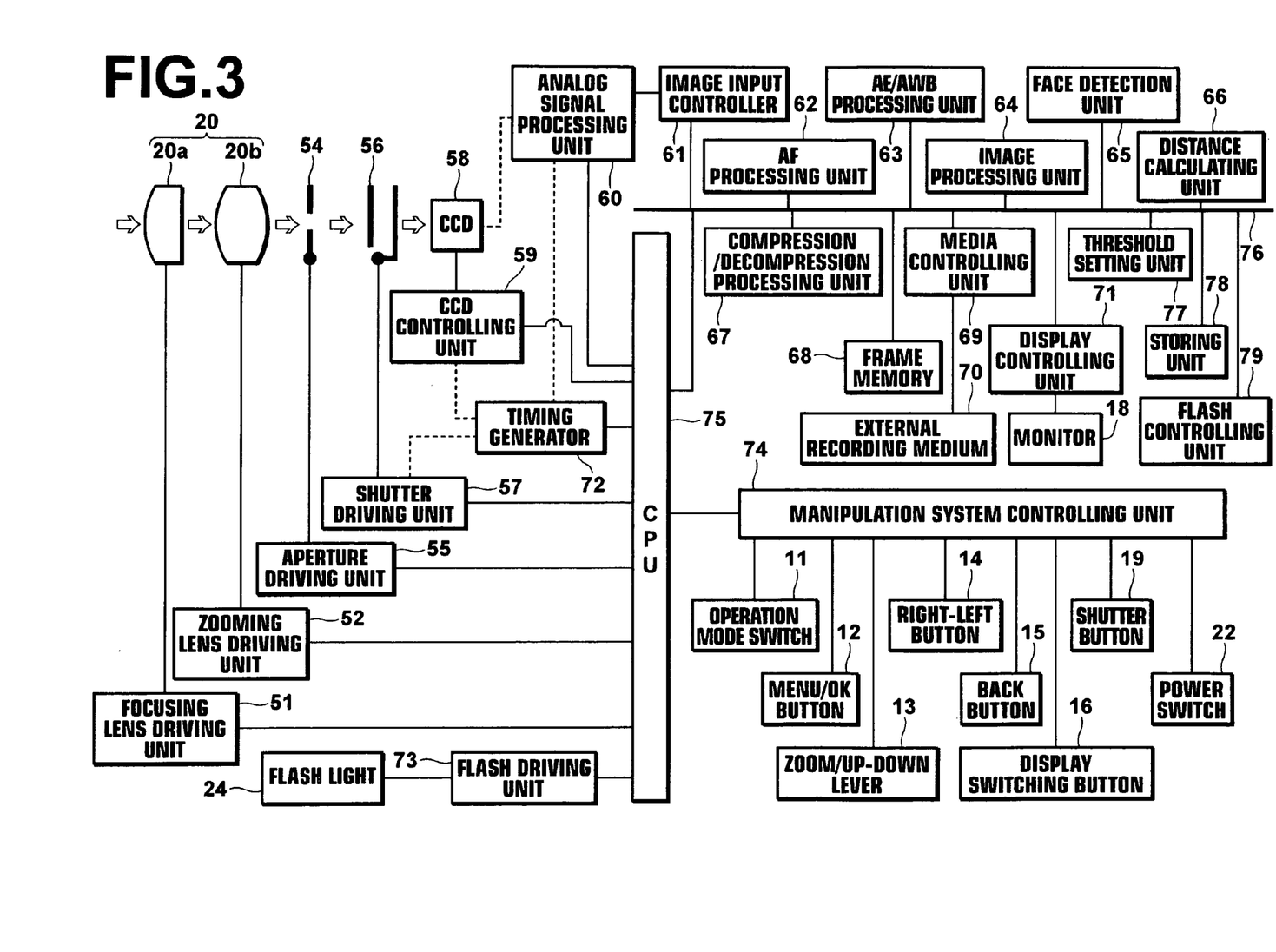
FIG. 3 is a functional block diagram of the digital camera.

FIG. 3 is a block diagram illustrating the functional configuration of the digital camera 1. As shown in FIG. 3, a manipulation system of the digital camera 1 including the operation mode switch 11, the menu/OK button 12, the zoom/up-down lever 13, the right-left button 14, the Back (return) button 15, the display switching button 16, the shutter button 19 and the power switch 22, which are described above, and a manipulation system controlling unit 74, which serves as an interface between the CPU 75 and user's manipulation through these switches, buttons and lever, are provided.

Further, a focusing lens 20a and a zooming lens 20b, which form the imaging lens 20, are provided. These lenses can respectively be driven stepwise along the optical axis by a focusing lens driving unit 51 and a zooming lens driving unit 52, each formed by a motor and a motor driver. The focusing lens driving unit 51 drives the focusing lens 20a stepwise based on focusing lens driving amount data outputted from an AF processing unit 62. The zooming lens driving unit 52 controls stepwise driving of the zooming lens 20b based on data representing manipulation amount of the zoom/up-down lever 13.

An aperture 54 is driven by an aperture driving unit 55, which is formed by a motor and a motor driver. The aperture driving unit 55 adjusts the aperture diameter of the aperture 54 based on aperture value data outputted from an AE (automatic exposure)/AWB (automatic white balance) processing unit 63.

The shutter 56 is a mechanical shutter, and is driven by a shutter driving unit 57 formed by a motor and a motor driver. The shutter driving unit 57 controls opening and closing of the shutter 56 according to a signal representing a pressed-state of the shutter button 19 and shutter speed data outputted from the AE/AWB processing unit 63.

The CCD 58, which is an image pickup device, is disposed downstream the optical system. The CCD 58 includes a photoelectric surface formed by a large number of light receiving elements arranged in a matrix. An image of the subject passing through the optical system is focused on the photoelectric surface and is subjected to photoelectric conversion. A micro lens array (not shown) for converging the light at each pixel and a color filter array (not shown) formed by regularly arrayed R, G and B color filters are disposed upstream the photoelectric surface. The CCD 58 reads electric charges accumulated at the respective pixels line by line and outputs them as an image signal synchronously with a vertical transfer clock signal and a horizontal transfer clock signal supplied from a CCD controlling unit 59. A time for accumulating the charges at the pixels, i.e., an exposure time, is determined by an electronic shutter driving signal supplied from the CCD controlling unit 59.

The image signal outputted from the CCD 58 is inputted to an analog signal processing unit 60. The analog signal processing unit 60 includes a correlation double sampling circuit (CDS) for removing noise from the image signal, an automatic gain controller (AGC) for controlling a gain of the image signal, and an A/D converter (ADC) for converting the image signal into a digital signal data. The digital signal data is CCD-RAW data, which includes R, G and B density values at the individual pixels.

The timing generator 72 generates a timing signal. The timing signal is inputted to the shutter driving unit 57, the CCD controlling unit 59 and the analog signal processing unit 60, thereby synchronizing the manipulation of the shutter button 19 with opening/closing of the shutter 56, transfer of the electric charges of the CCD 58 and processing by the analog signal processing unit 60.

A flash driving unit 73 (corresponding to a flashing means of the invention) causes the flash light 24 to be emitted based on a signal supplied from a flash controlling unit 79 (corresponding to a flash controlling means of the invention), which will be described later.

An image input controller 61 writes the CCD-RAW data inputted from the analog signal processing unit 60 in a frame memory 68. The frame memory 68 provides a workspace for various digital image processing (signal processing) applied to the image data, which will be described later. The frame memory 68 is formed, for example, by a SDRAM (Synchronous Dynamic Random Access Memory) that transfers data synchronously with a bus clock signal of a constant frequency.

A display controlling unit 71 causes the image data stored in the frame memory 68 to be displayed on the monitor 18 as a live view. The display controlling unit 71 converts the image data into a composite signal by combining the luminance (Y) signal and the chromatic (C) signals and outputs the composite signal to the monitor 18. The live view is taken at a predetermined time interval and displayed on the monitor 18 while the photographing mode is selected. The display controlling unit 71 also causes an image, which is based on the image data contained in the image file stored in the external recording medium 70 and read out by the media controlling unit 69, to be displayed on the monitor 18.

The AF processing unit 62 and the AE/AWB processing unit 63 determine a photographing condition based on preliminary images. The preliminary images are images based on image data, which is stored in the frame memory 68 when the CPU 75, upon detecting a signal representing a half-pressed state of the shutter button 19 generated when the shutter button 19 is half-pressed, causes the CCD 58 to carry out preliminary photographing.

The AF processing unit 62 detects the focal position based on the preliminary images and outputs the focusing lens driving amount data. In this embodiment, a passive method is used for detecting the focused focal point. The passive method utilizes the fact that a focused image has a higher focus evaluation value (contrast value) than an unfocused image.

The AE/AWB processing unit 63 measures a brightness of the subject based on the preliminary image, and then determines the aperture value, the shutter speed, and the like, to output the determined aperture value data and shutter speed data (AE), and controls the white balance for photographing the subject (AWB).

The image processing unit 64 applies, to the image data of the actually photographed image, image quality correction processing, such as gamma correction, sharpness correction and contrast correction, and YC processing to convert the CCD-RAW data into YC data formed by Y data representing a luminance signal, Cb data representing a blue color-difference signal and Cr data representing a red color-difference signal. The actually photographed image is an image based on image data, which is stored in the frame memory 68, via the analog signal processing unit 60 and the image input controller 61, according to an image signal outputted from the CCD 58 when the shutter button 19 is pressed. The upper limit for the number of pixels forming the actually photographed image is determined by the number of pixels of the CCD 58. The number of pixels of an image to be recorded can be changed according to image quality setting by the user, such as fine or normal. The number of pixels forming the live view or the preliminary image may be smaller than that of the actually photographed image and may be, for example, about 1/16 of the number of pixels forming the actually photographed image.

A compression/decompression processing unit 67 applies compression processing according to a certain compression format, such as JPEG, to the image data that has been subjected to the image quality correction and/or other processing by the image processing unit 64, to generate an image file. To the image file, associated information based on corresponding one of various data formats is added. In the playback mode, the compression/decompression processing unit 67 reads out the compressed image file from the external recording medium 70, and applies decompression processing to the image file. The decompressed image data is outputted to the display controlling unit 71, and the display controlling unit 71 displays the image based on the image data on the monitor 18.

The media controlling unit 69 corresponds to the media slot 26 shown in FIG. 2. The media controlling unit 69 reads out an image file stored in the external recording medium 70 or writes an image file in the external recording medium 70.

Figure 4A:
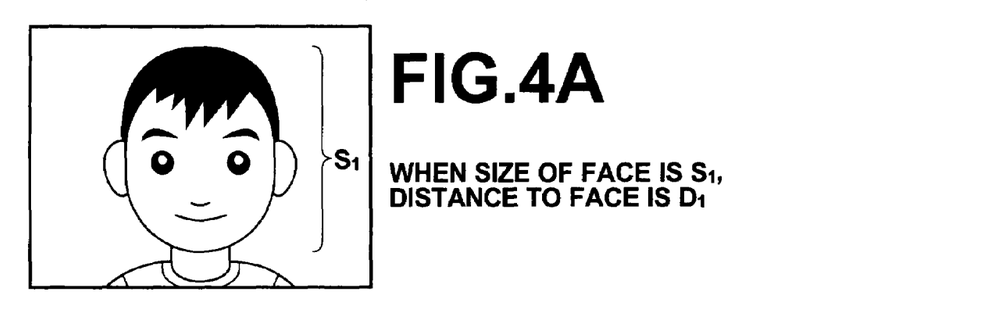
FIGS. 4A and 4B are diagrams illustrating image data photographed at a distance relatively nearer to a subject and image data photographed at a distance relatively farther from the subject.
Figure 4B:
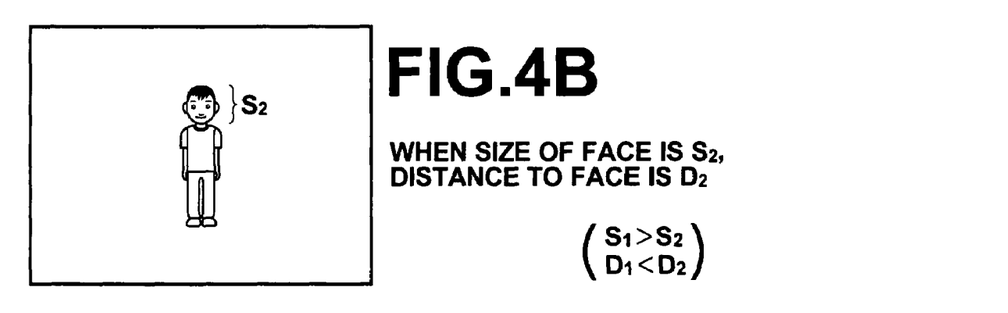

A face detection unit 65 (corresponding to a detecting means of the invention) detects a face or eyes of a person from the image data stored in the frame memory 68. In this embodiment, a case where a face of a person is detected is explained. However, the target object to be detected may be any object as long as the size thereof is known, such as eyes of a person, or a face or eyes of an animal. FIG. 4 shows image data photographed at a distance relatively nearer to the subject, which is shown at A, and image data photographed at a distance farther from the subject than the distance of the case A, which is shown at B.

A distance calculating unit 66 (corresponding to a calculating means of the invention) calculates a size of the face $S_1$, $S_2$, as shown at A and B in FIG. 4, based on face data detected from the image data by the face detection unit 65 as described above, and then calculates a distance to the face $D_1$, $D_2$ based on the calculated size of the face $S_1$, $S_2$, respectively. Data representing a relationship between each size of the face $S_1$, $S_2$ and each distance to the face $D_1$, $D_2$, i.e., a conversion table has been stored in advance in a storing unit 78. In a case where the relationship between the sizes of the face $S_1$ and $S_2$ is $S_1 > S_2$, the relationship between the distances to faces $D_1$ and $D_2$ is $D_1 < D_2$. A predetermined formula may be used for calculating the distance to the face $D_1$, $D_2$ from the size of the face $S_1$, $S_2$.

Figure 5A:
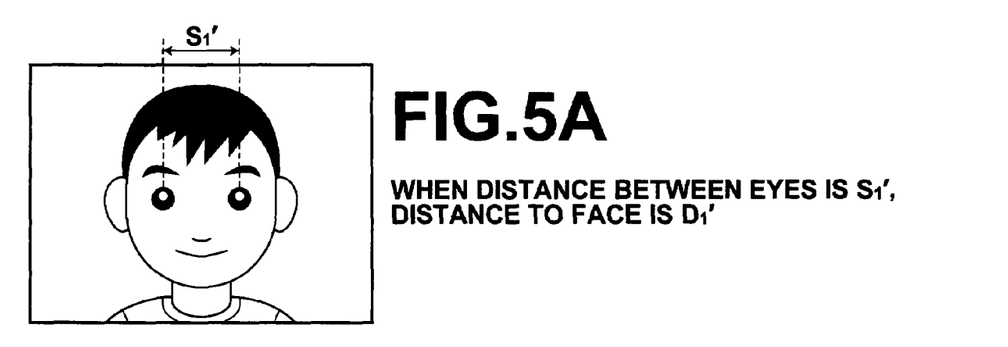
FIGS. 5A and 5B are diagrams similar to FIGS. 4A and 4B, illustrating another embodiment.
Figure 5B:
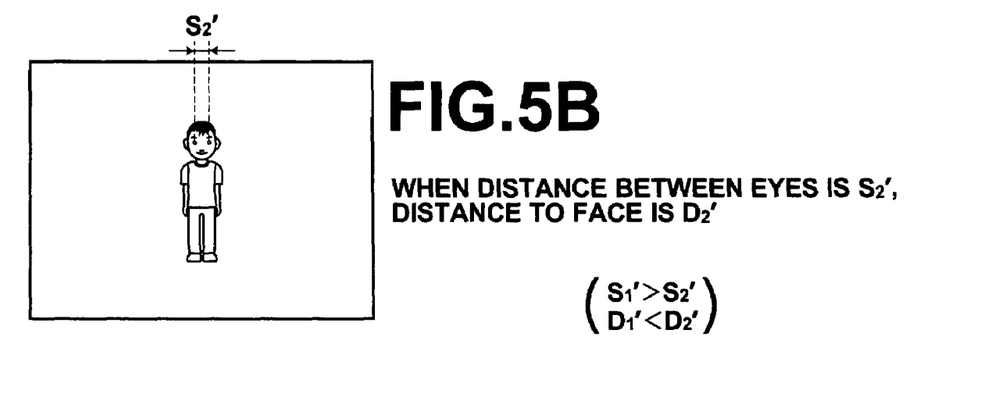

In a case where eyes of a person are detected from the image data by the face detection unit 65, a distance between the eyes $S_1'$, $S_2'$ is calculated as shown at A and B in FIG. 5, and then, the distance to the face $D_1'$, $D_2'$ is calculated based on the calculated distance between the eyes $S_1'$, $S_2'$, respectively. Data representing a relationship between each distance between the eyes $S_1'$, $S_2'$ and each distance to the face $D_1'$, $D_2'$, i.e., a conversion table has been stored in advance in the storing unit 78. In a case where the relationship between the distances between the eyes $S_1'$ and $S_2'$ is $S_1' > S_2'$, the relationship between the distances to the face $D_1'$ and $D_2'$ is $D_1' < D_2'$. Similarly to the above case, a predetermined formula may be used for calculating the distance to the face $D_1'$, $D_2'$ from the distance between the eyes $S_1'$, $S_2'$.

A threshold setting unit 77 (corresponding to a threshold setting means of the invention) sets a predetermined threshold L based on a reachable distance of the flash light 24 emitted by the flash driving unit 73, and the threshold is stored in the storing unit 78. It should be noted that the predetermined threshold L varies depending on performance of the flash light 24, and may be set in advance in the storing unit 78.

The flash controlling unit 79 (corresponding to a flash controlling means of the invention) controls the amount of the flash light 24 emitted by the flash driving unit 73 depending on the distance to the face D calculated by the distance calculating unit 66. What is characteristic to the invention is that the flash controlling unit 79 inhibits emission of the flash light 24 by the flash driving unit 73 if distance to the face D calculated by the distance calculating unit 77 is larger than the threshold L set by the threshold setting unit 77, i.e., D>L. Here, a conventional flash controlling device is explained with reference to FIGS. 9, 10A and 10B.

Figure 9:
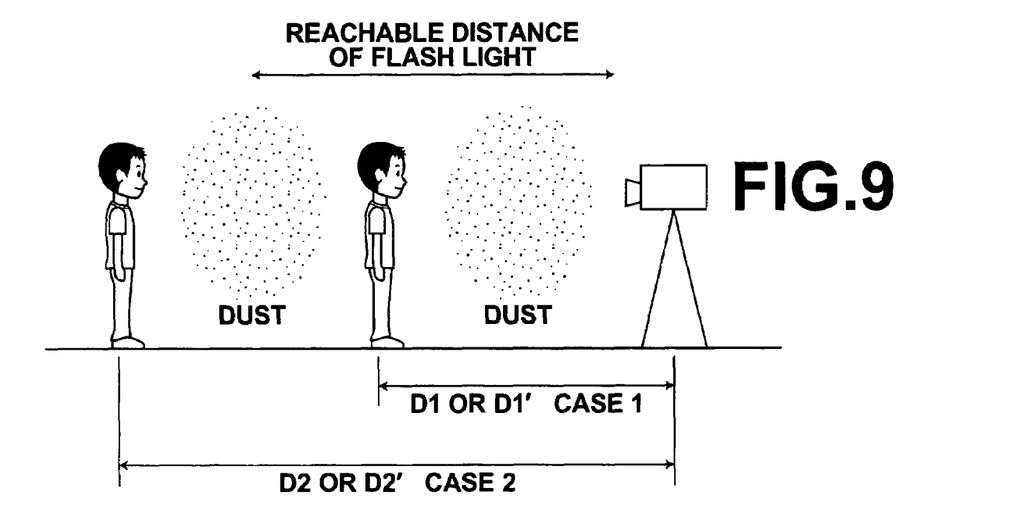
FIG. 9 is a diagram for explaining a conventional flash controlling device.
Figure 10A:
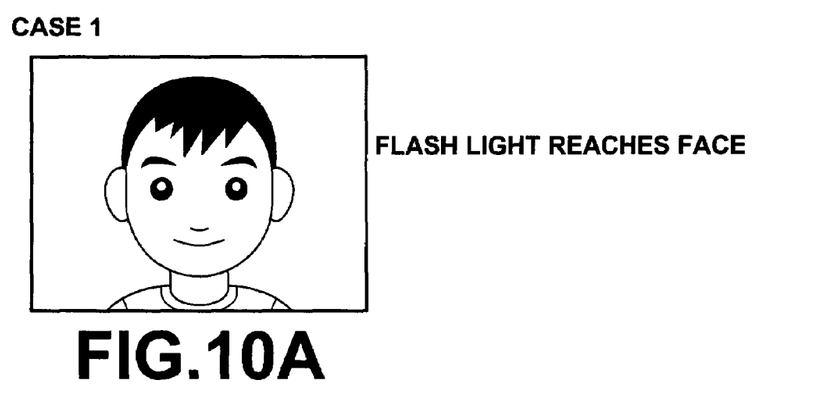
FIGS. 10A and 10B are diagrams for explaining the conventional flash controlling device.
Figure 10B:
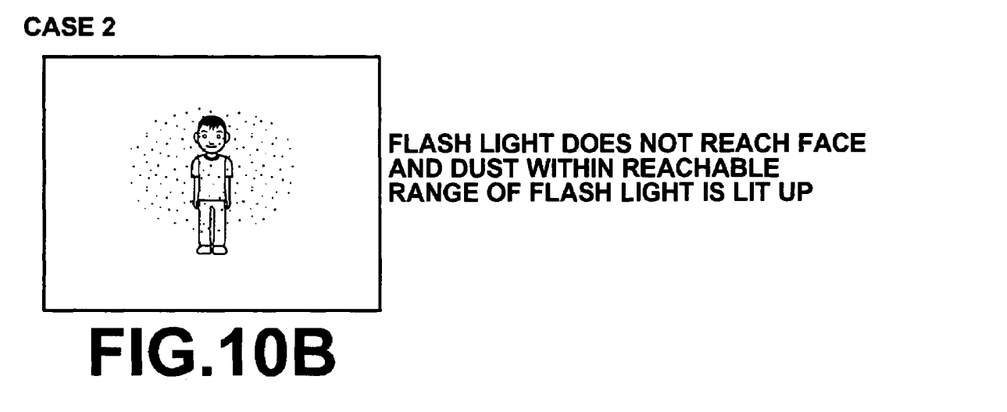

Conventionally, the flash light 24 is emitted by the flash driving unit 73 even when the face is out of the reachable distance of the flash light 24, as in case 2 shown in FIG. 9. When the flash light 24 reaches the face, the face can be photographed brightly, as shown in FIG. 10A. However, when the flash light 24 does not reach the face, the face is photographed darkly, and in addition, dust or the like within the reachable distance of the flash light 24 is lit up by the flash light 24, as shown in FIG. 10B.

In contrast, according to the invention, as described above, when the face is out of the reachable distance of the flash light 24 (D>L), emission of the flash light 24 is inhibited. This prevents useless emission, and also prevents the dust or the like from being lit up. In this manner, power consumption by emission of the flash light 24 can be reduced, and the digital camera 1 with lower power consumption can be achieved.

The CPU 75 controls the individual parts of the body of the digital camera 1 according to user's manipulation of the various buttons, levers and switches and signals from the respective functional blocks. The data bus 76 is connected to the image input controller 61, the various processing units 62 to 67, the frame memory 68, the various controlling units 69, 71 and 80, the distance calculating unit 77, the storing unit 78, the threshold setting unit 79 and the CPU 75, and transmission of various signals and data is carried out via the data bus 76.

Figure 6:
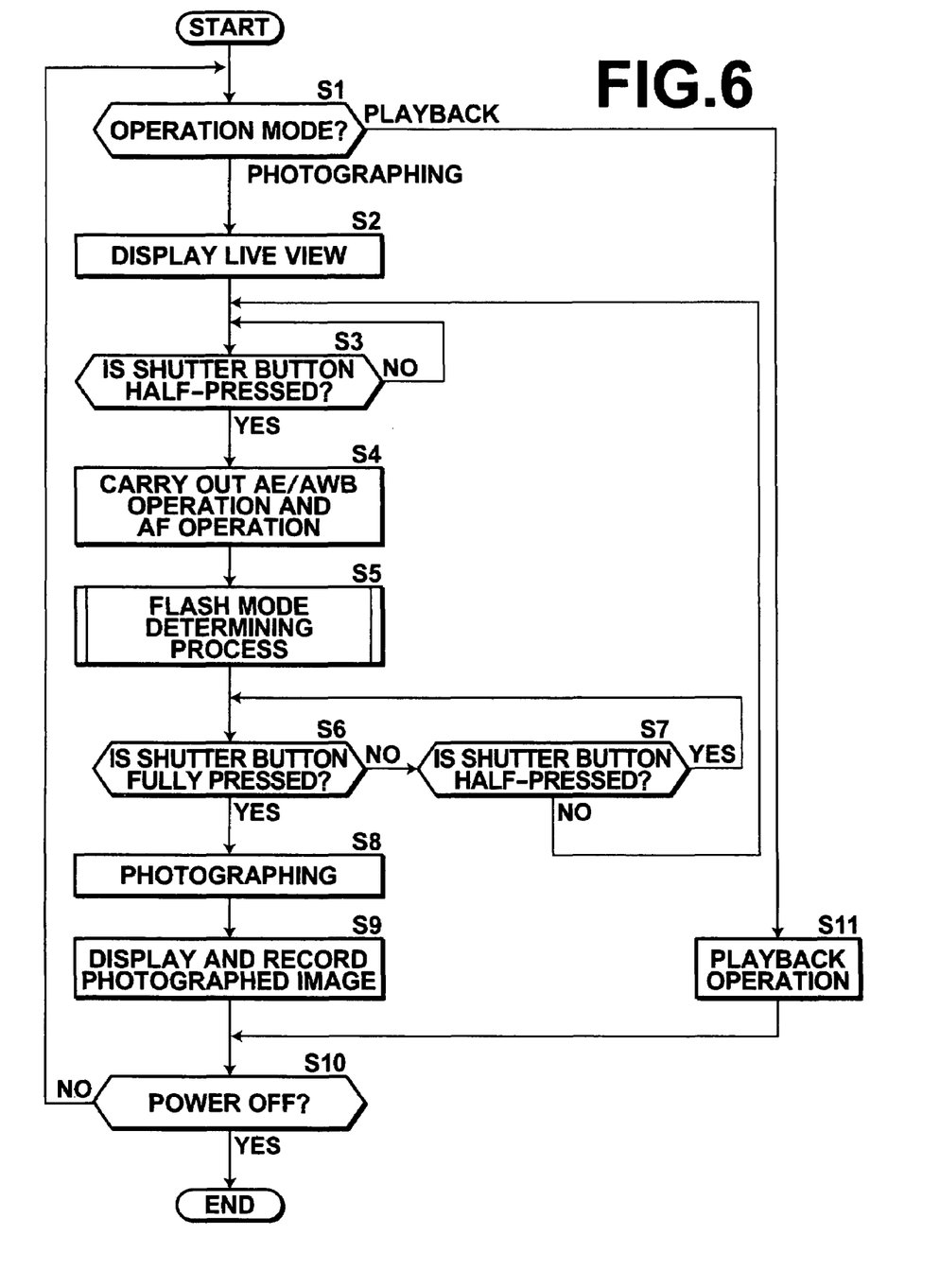
FIG. 6 is a flow chart illustrating a series of operations carried out in the digital camera.

Next, a process carried out in the digital camera 1 having the above-described configuration during photographing will be described. FIG. 6 is a flow chart showing a series of operations carried out in the digital camera. First, as shown in FIG. 6, the CPU 75 determines whether the operation mode is the photographing mode or the playback mode based on the setting of the operation mode switch 11 (step S1). If the operation mode is the playback mode (step S1: PLAYBACK), the playback operation is carried out (step S11). In the playback operation, the media controlling unit 69 reads out the image file stored in the external recording medium 70, and causes the image based on the image data contained in the image file to be displayed on the monitor 18. As the playback operation ends, the CPU 75 determines whether or not the power switch 22 of the digital camera 1 is turned off (step S10). If the power switch has been turned off (step S10: YES), the digital camera 1 is powered off, and the process ends.

On the other hand, if it is determined in step S that the operation mode is the photographing mode (step S1: PHOTOGRAPHING), the CPU 75 exerts control to display the live view (step S2). Displaying the live view means displaying the preliminary images on the monitor 18. Then, the CPU 75 determines whether or not the shutter button 19 is half-pressed (step S3). If the shutter button is not half-pressed (step S3: NO), the CPU 75 repeats the operation in step S3. If the shutter button is half-pressed (step S3: YES), the AE/AWB processing unit 63 and the AF processing unit 62 carry out the AE/AWB operation and the AF operation, respectively, based on the preliminary images (step S4). Then, the flash controlling unit 79 determines the flash mode (step S5).

Figure 7:
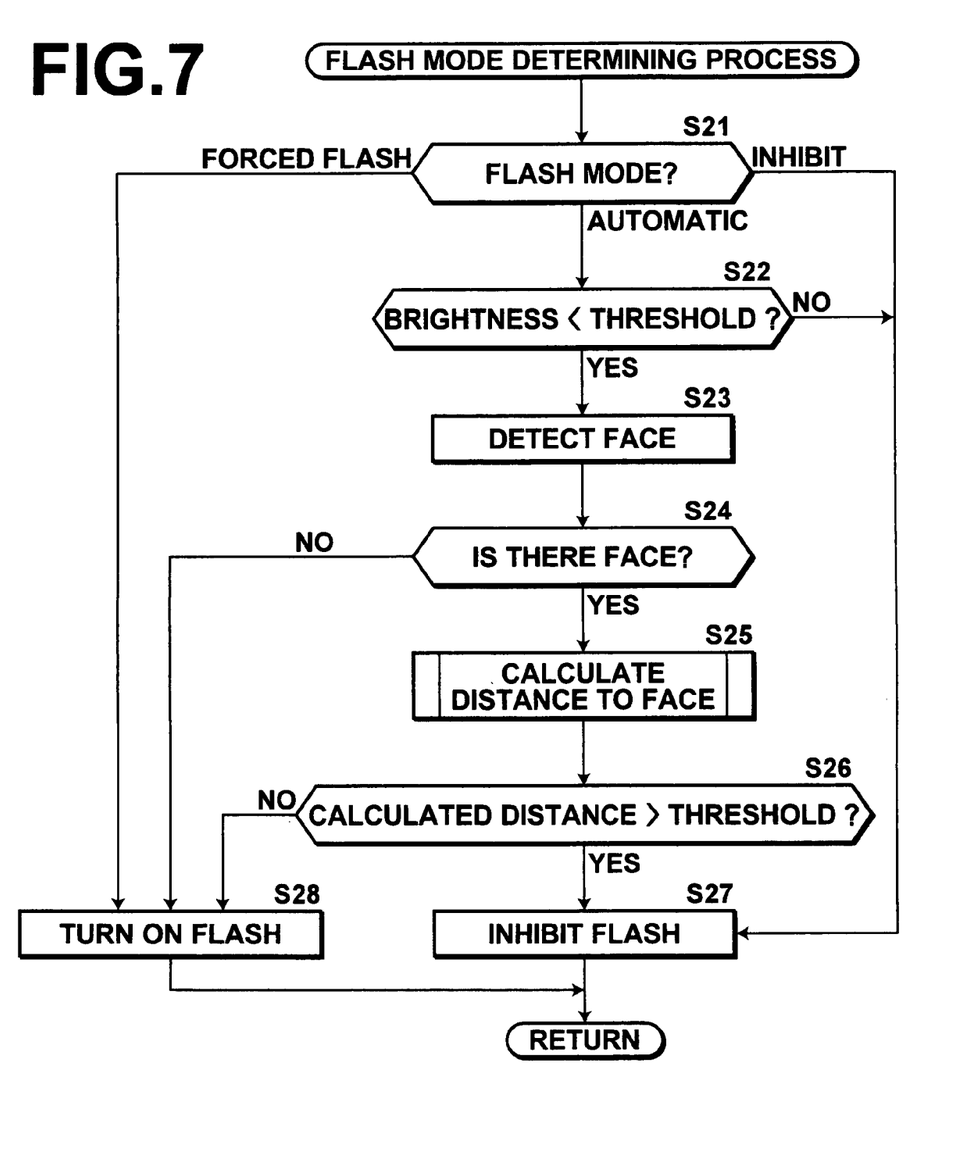
FIG. 7 is a flow chart illustrating a flash mode determining process.

FIG. 7 is a flow chart of the flash mode determining process. First, as shown in FIG. 7, the flash controlling unit 79 determines the flash mode (step S21). If the flash mode is "inhibit" (step S21: INHIBIT), emission of the flash light 24 by the flash driving unit 73 is inhibited (step S27) during a photographing operation (step S8 in FIG. 6), which will be described later. If the flash mode is "forced flash" (step S21: FORCED FLASH), flash light 24 is emitted by the flash driving unit 73 (step S28) during the photographing operation (step S8 in FIG. 6).

If the flash mode is "automatic" (step S21: AUTOMATIC), the CPU 75 determines whether or not a brightness of the subject (BV value) measured by the AE/AWB processing unit 63 based on the preliminary image in step S4 is lower than a predetermined threshold, i.e., whether or not the preliminary image has a predetermined level of luminance (step S22). It should be noted that the predetermined threshold can be expressed by a value obtained by subtracting a photographing sensitivity (SV value) from a sum of an open aperture (AV value), which is a brightness when the aperture 54 is fully open, and a shutter speed (TV value) at the limit of the shutter speed range where blur due to movement of the hand holding the camera is avoided. If the brightness of the subject is not less than the predetermined threshold, i.e., the preliminary image has a predetermined level of luminance (step S22: NO), the CPU 75 moves the process to step S27. On the other hand, if it is determined that the brightness of the subject is lower than the predetermined threshold, i.e., the preliminary image does not have a predetermined level of luminance (step S22: YES), the face detection unit 65 detects a face from the image data stored in the frame memory 68 (step S23). If no face has been detected (step S24: NO), the CPU 75 moves the process to step S28. If the face has been detected (step S24: YES), the distance calculating unit 66 calculates the distance to the face (step S25).

Figure 8:
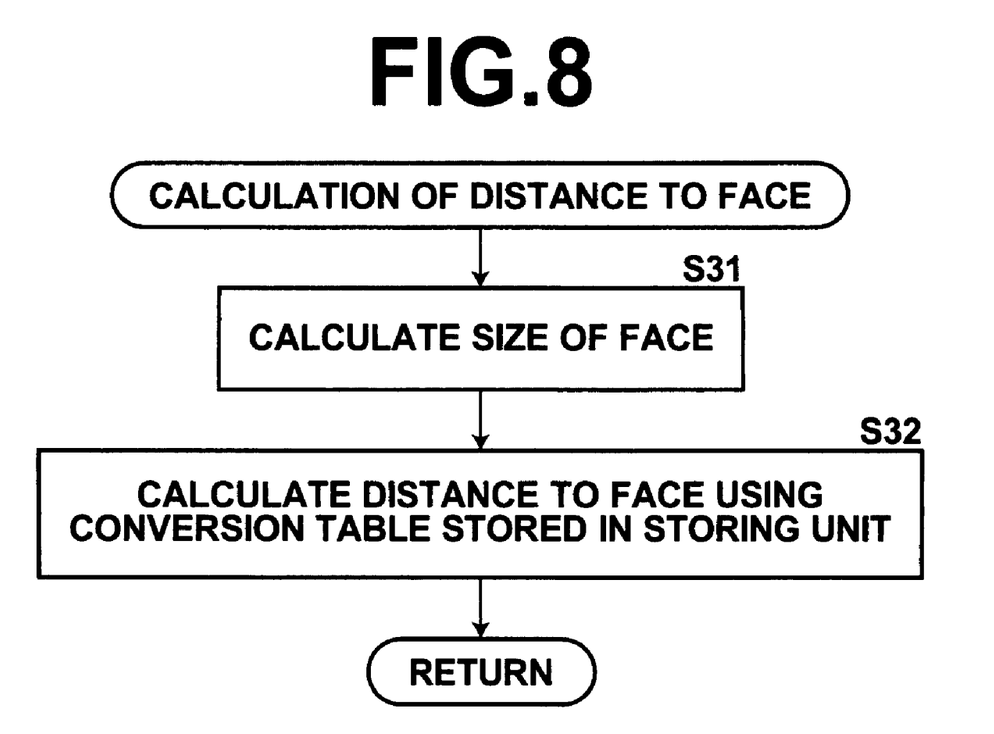
FIG. 8 is a flow chart illustrating calculation of a distance to the face.

FIG. 8 is a flow chart of the calculation of the distance to the face by the distance calculating unit 66. First, a size of the face S is calculated from the face data detected by the face detection unit 65 (step S31). Then, a distance to the face D is calculated from the calculated size of the face S using the conversion table stored in the storing unit 78 (step S32). As the distance to the face D has been calculated, the process returns to the flash mode determining process shown in FIG. 7. Then, the CPU 75 determines whether or not the distance to the face D calculated by the distance calculating unit 66 is smaller than the threshold L, which has been determined by the threshold setting unit 77 and stored in the storing unit 78 (step S26). If the distance to the face D is smaller than the threshold L (step S26: NO), the CPU 75 moves the process to step S28. If the distance to the face D is larger than the threshold L (step S26: YES), the CPU 75 moves the process to step S27. In this manner, emission of the flash light 24 can be inhibited when the face is out of the reachable range of the flash light 24, and useless emission of the flash light 24 can be prevented. This reduces power consumption by the emission of the flash light 24, thereby achieving the digital camera 1 with lower power consumption. In addition, inclusion of lit up dust, or the like, which is present within the reachable range of the flash light 24 between the face and the imaging lens 20 of the digital camera 1, in the photographed image can be prevented.

It should be noted that, if it is determined that emission of the flash light 24 by the flash driving unit 73 is inhibited (step S27), then, after step S27, the lower limit of the shutter speed (TV value) may be further lowered to increase the exposure time. In this case, although the photographed image may blur due to movement of the subject and/or movement of the hand, the photographed image containing a brighter face can be obtained without emitting the flash light 24. In a case where this operation is not carried out, the brightness of the image is corrected by the image processing unit 64. As the flash mode has been determined, the process returns to the flow chart shown in FIG. 6.

After the flash mode determining process (step S5), determination is made as to whether or not the shutter button 19 is fully pressed (step S6). If the shutter button 19 is not fully pressed (step S6: NO), the CPU 75 determine whether or not the shutter button 19 is half-pressed (step S7). If the shutter button 19 is not half-pressed (step S7: NO), the CPU 75 moves the process to step S3. If the shutter button 19 is half-pressed (step S7: YES), the CPU 75 moves the process to step S6. If the shutter button 19 is fully pressed (step S6: YES), the CPU 75 carries out the photographing operation (step S8) under the flashing condition determined in the flash mode determining process (step S5). The photographing operation here refers to a series of operations from the A/D conversion of the analog image data based on the image of the subject focused on the photoelectric surface of the CCD 58 to the various signal processing by the image processing unit 64. The photographing operation may further include the compression by the compression/decompression processing unit 67 applied to the image data, which has been subjected to the signal processing, to generate the image file.

As the photographing operation has been completed, the CPU 75 displays the photographed image on the monitor 18, and records the photographed image in the external recording medium 70 (step S9). Then, the CPU 75 determines whether or not the power switch 22 has been turned off (step S10). If the power switch 22 has been turned off (step S10: YES), the digital camera 1 is powered off, and the process ends. If the power switch 22 has not been turned off (step S10: NO), the process proceeds to step S1.

It should be noted that, although the flash mode determining process is carried out (step S5) after the AE/AWB operation and the AF operation have been carried out (step S4) in the flow chart of FIG. 6 in this embodiment, the invention is not limited to this embodiment. The flash mode determining process (step S5) may be carried out at any time before photographing (step S8) (i.e., before the shutter button 19 is fully pressed), such as before the shutter button 19 is half-pressed (step S3). Further, although the face detection is carried out (step S23) after it has been determined that the brightness of the subject (BV value) is lower than the predetermined threshold (step S22: YES) in the flow chart of FIG. 7 in this embodiment, the invention is not limited to this embodiment. The face detection (step S23) may be carried out immediately after the live view has been displayed (step S2).

According to the flash controlling device and the flash controlling method of the invention, a predetermined threshold is set based on a reachable distance of the flash light, and emission of flash light by a flashing means is inhibited when a distance to a predetermined target object calculated by a calculating means is larger than the predetermined threshold. Thus, emission of the flash light can be inhibited when the target object is out of the reachable range of the flash light, thereby preventing emission of useless flash light. This reduces power consumption by the flashing, and therefore, a photographing apparatus with lower power consumption can be achieved. In addition, inclusion of lit up dust, or the like, which is present within the reachable range of the flash light between the target object and the photographing apparatus, in the photographed image can be prevented.

What is claimed is:

1. A flash controlling device comprising:
   an acquisition unit that acquires image data by photographing a subject;
   a detector that detects a predetermined target object from the image data;
   a calculator that calculates a distance to the predetermined target object based on a size of the predetermined target object;
   a flash that emits flash light toward the subject;
   a flash controller that controls an amount of the flash light to be emitted by the flash based on the calculated distance; and
   a threshold setting unit that sets a predetermined threshold based on a reachable distance of the flash light,
   wherein the flash controller inhibits emission of the flash light when the calculated distance is larger than the predetermined threshold, and further
   wherein, upon flash inhibition, said controller also triggers a lowering of a lower limit of a shutter speed such that exposure time is increased when flash emission is inhibited.

2. The flash controlling device as claimed in claim 1, wherein the predetermined target object comprises a face or eyes of a person.

3. A flash controlling method comprising:
   acquiring image data by photographing a subject;
   detecting a predetermined target object from the image data;
   calculating a distance to the predetermined target object based on a size of the detected predetermined target object;
   controlling an amount of flash light to be emitted by a flash based on the calculated distance;
   setting a predetermined threshold based on a reachable distance of the flash light;
   inhibiting emission of the flash light when the calculated distance is larger than the predetermined threshold; and
   lowering a lower limit of a shutter speed such that exposure time is increased after said inhibiting.

4. A computer-readable medium having a program stored thereon that, when executed by a digital camera, causes the camera to perform a flash controlling method comprising:
   acquiring image data by photographing a subject;
   detecting a predetermined target object from the image data;
   calculating a distance to the predetermined target object based on a size of the detected predetermined target object;
   controlling an amount of flash light to be emitted by a flash based on the calculated distance;
   setting a predetermined threshold based on a reachable distance of the flash light;
   inhibiting emission of the flash light when the calculated distance is larger than the predetermined threshold; and
   lowering a lower limit of a shutter speed such that exposure time is increased after said inhibiting.

* * * * *